Figure 1:
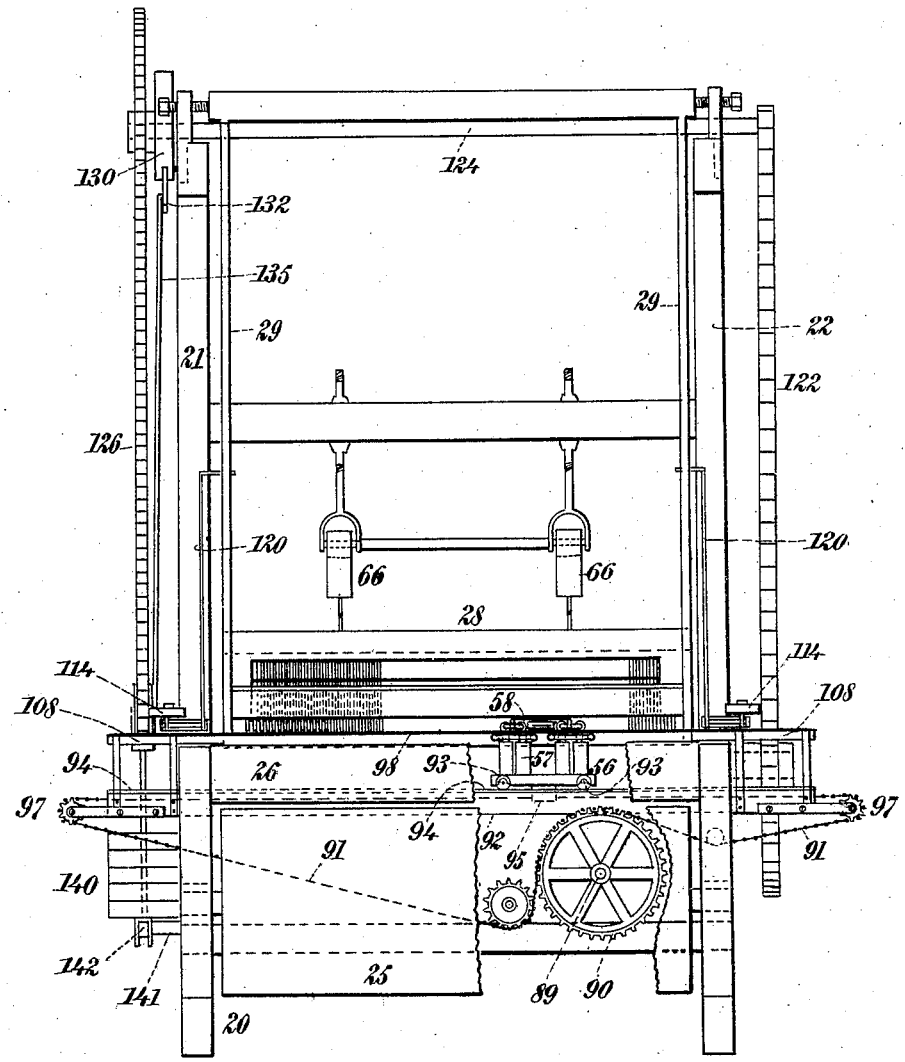

No. 779,025. PATENTED JAN. 3, 1905.
W. R. BURROWS.
LOOM.
APPLICATION FILED FEB. 24, 1903.

5 SHEETS—SHEET 3.

WITNESSES:
G. Dieterich.
Arthur Marion.

INVENTOR
William R. Burrows.
BY
Chas. O. Gill
ATTORNEY

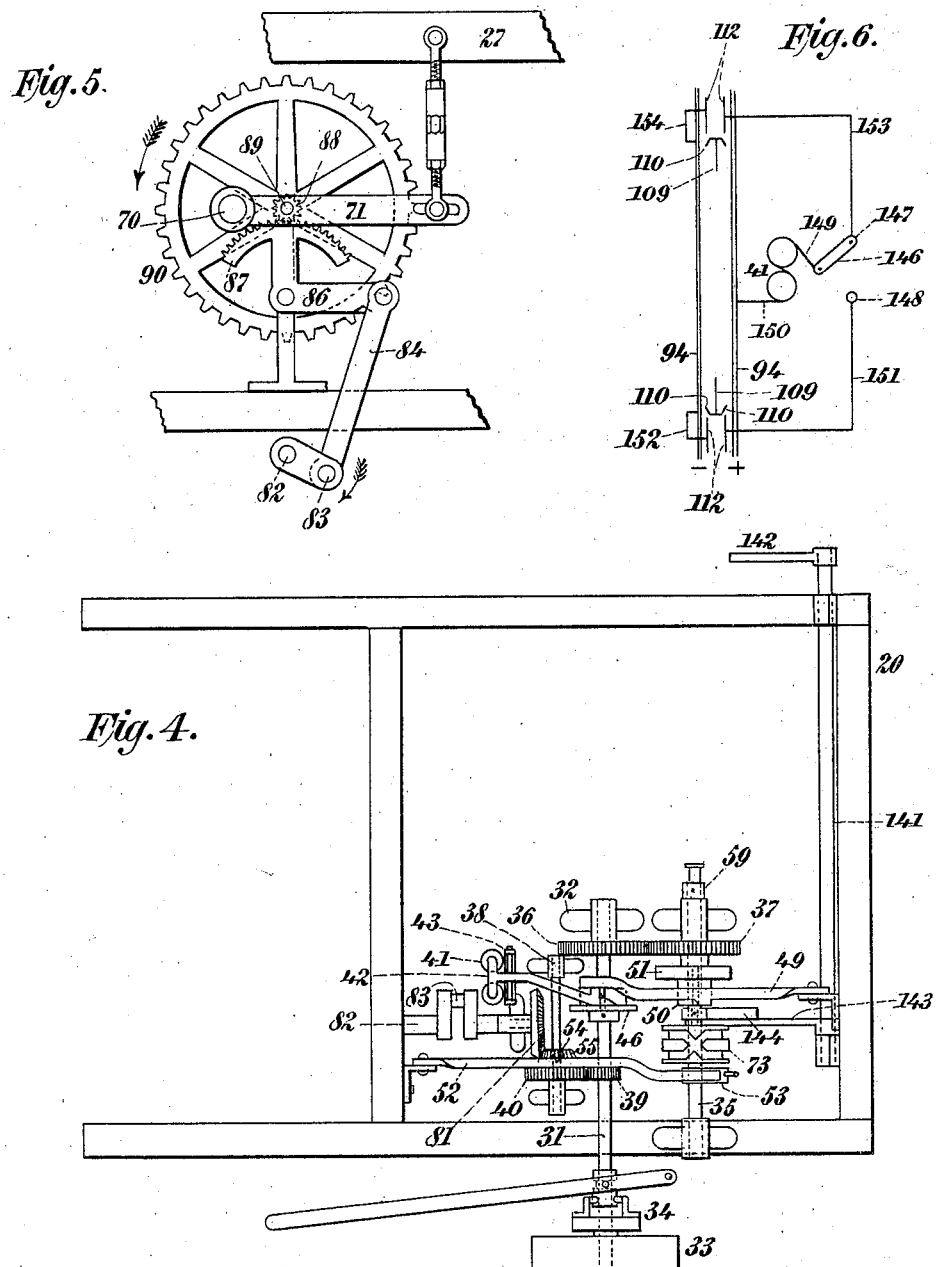

No. 779,025. PATENTED JAN. 3, 1905.
W. R. BURROWS.
LOOM.
APPLICATION FILED FEB. 24, 1903.
5 SHEETS—SHEET 5.
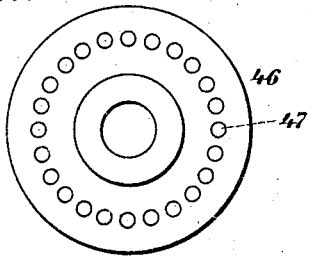
Fig. 7.
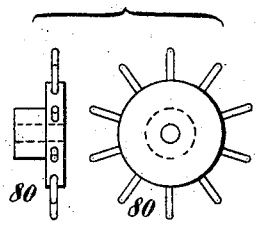
Fig. 10.
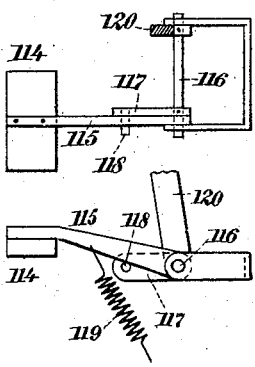
Fig. 11.
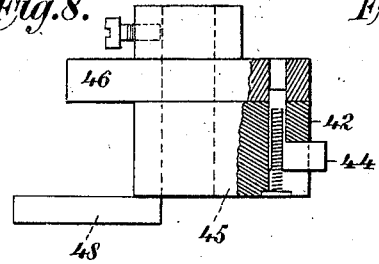
Fig. 8.
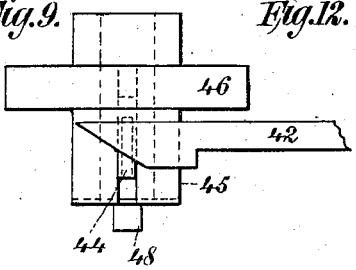
Fig. 9.
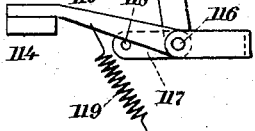
Fig. 12.
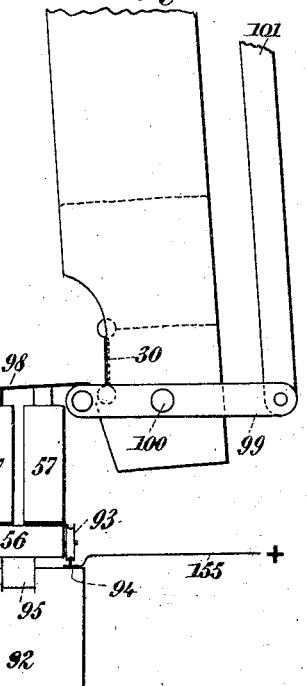
Fig. 13.
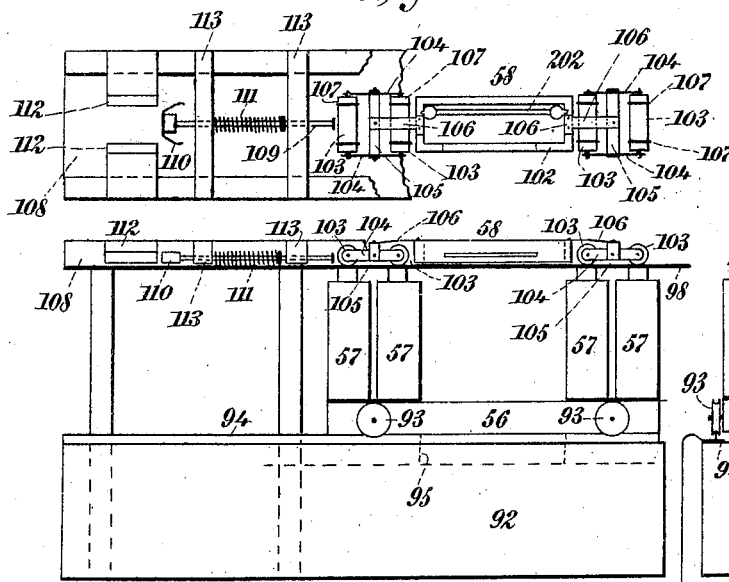
Fig. 15.
Fig. 14.
WITNESSES:
G. Dieterich.
Arthur Marion.
INVENTOR
William R. Burrows,
BY
Chas. E. Gill
ATTORNEY No. 779,025. Patented January 3, 1905.

UNITED STATES PATENT OFFICE.

WILLIAM R. BURROWS, OF NEWARK, NEW JERSEY.

LOOM.

SPECIFICATION forming part of Letters Patent No. 779,025, dated January 3, 1905.

Application filed February 24, 1903. Serial No. 144,598.

*To all whom it may concern:*

Be it known that I, WILLIAM R. BURROWS, a citizen of the United States, and a resident of Newark, in the county of Essex and State of New Jersey, have invented certain new and useful Improvements in Looms, of which the following is a specification.

The invention relates to improvements in looms; and it consists in the novel features, arrangements, and combinations of parts hereinafter described, and particularly pointed out in the claims.

I illustrate my invention in this application as embodied in a loom for weaving wire-cloth of the character required for use in paper-making machines, this wire-cloth being of very fine mesh and requiring the utmost uniformity throughout its entire extent.

The loom illustrated in the drawings presents some well-known features, these being the warp-beam, breast-beam, cloth-beam, lay-beam frame, and heddles, all of which perform their usual duties in the customary manner.

My invention pertains more particularly to novel features of construction and operation whereby the entire operation of the loom is rendered automatic and entirely efficient and reliable.

In accordance with my invention the shuttle, in itself of novel construction, is caused to travel on its path by means of electromagnets mounted on a carriage whose track-rails are electric conductors, and the entire loom is in its capability to operate placed under the control of an electromagnet which must be energized before the loom can start into operation and be reënergized prior to each successive action of the operative parts of the loom, the circuit through this magnet being broken by the movement of the heddles just before the shuttle starts on its movement and reëstablished by the shuttle on the latter reaching the end of its line of travel. In the absence of the circuit being thus reëstablished by the shuttle the controlling-electromagnet will not become reënergized, and the loom will come to a stop.

The invention will be fully understood from the detailed description hereinafter presented, reference being had to the accompanying drawings, in which—

Figure 2:
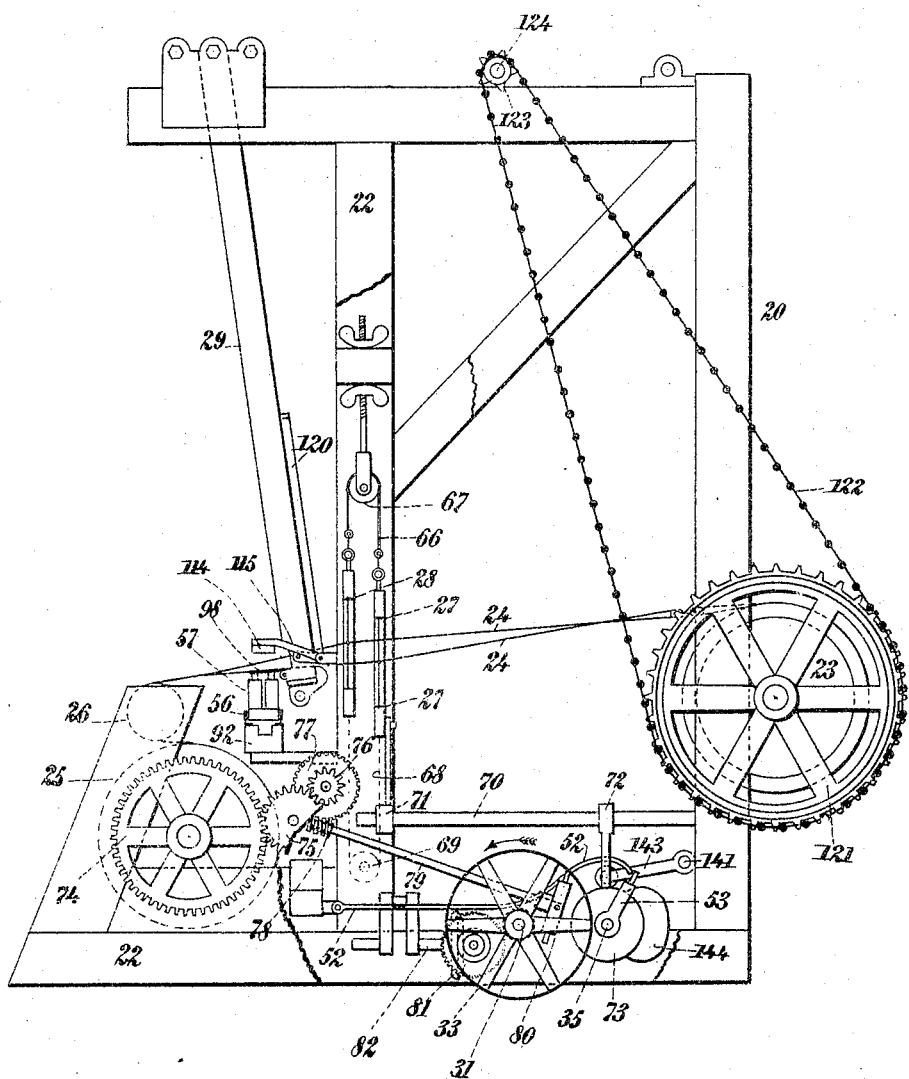
Figure 3:
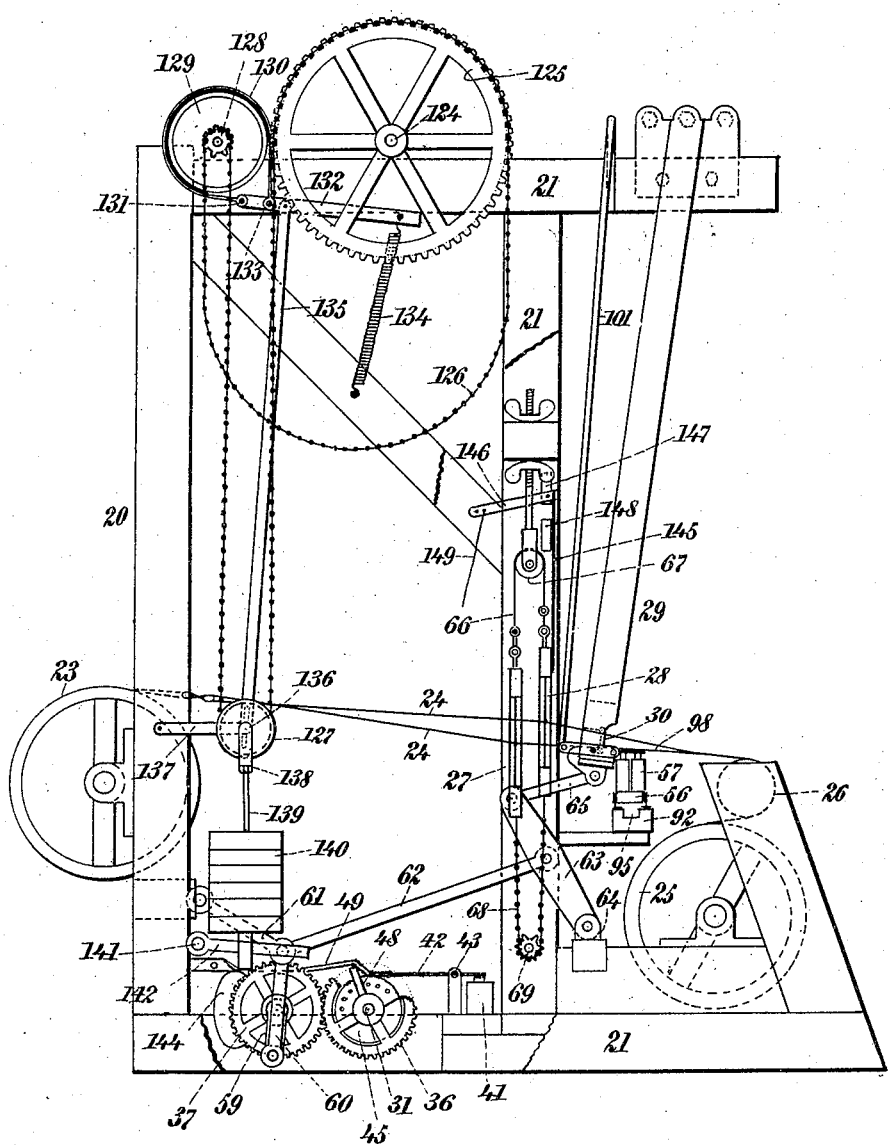

Figure 1 is a front elevation, partly broken away, of a loom constructed in accordance with and embodying the invention. Fig. 2 is a side elevation, partly broken away, taken at the right-hand side of same. Fig. 3 is a side elevation, partly broken away, taken at the left-hand side of same. Fig. 4 is a top view of a portion of the frame of the loom and is presented to illustrate a part of the operative mechanism of the several parts of the loom. Fig. 5 is an enlarged elevation looking from the rear to the front of the machine of a part of the mechanism for effecting the operation of the shuttle and heddles. Fig. 6 is a diagrammatic view of the electric circuits constituting a portion of the machine as hereinafter explained. Fig. 7 is a detached side elevation of a clutch-wheel on the power-shaft of the machine, this elevation having been taken from the left-hand side of the machine. Fig. 8 is a plan view, partly in section, of the clutch-wheel shown in Fig. 7 and coacting parts, Fig. 8 being presented to represent more especially the two parts of the clutch, this clutch being an ordinary pin-clutch. Fig. 9 is a top view of same and illustrates an arm having a cam edge for coöperation with the pin of the clutch. Fig. 10 presents an edge and face view of a star-wheel forming a part of the operative mechanism of the loom. Fig. 11 is a top view, partly in section, of a presser-foot with its operative connections for descending on the shuttle at the proper time and at the end of the stroke of the latter for preventing during the last part of the outward motion of the lay-beam the rotation of the bobbin within the shuttle. Fig. 12 is a side elevation, partly broken away, of same. Fig. 13 is an enlarged view, taken from one side of the machine, of a portion of the lay-beam, the track for the carriage comprising the electromagnets and the race above said magnets and along which the shuttle will have its movement. Fig. 14 is an enlarged front elevation of a portion of the machine and is presented to illustrate more fully the shuttle and its mechanism and the carriage, having the electromagnets for effecting the movement of said shuttle along the race; and Fig. 15 is a top view illustrating the shuttle and the means at the end of the stroke of the shuttle for making an electric circuit.

In the drawings, 20 designates the general frame of the machine, 21 the left-hand side of said frame, 22 the right-hand side thereof, 23 the warp-beam, from which the warp wires or threads 24 unwind, 25 the cloth-beam, upon which the finished cloth is wound, 26 the breast-beam, over which the cloth passes to the beam 25, 27 the rear heddle, 28 the front heddle, 29 the lay-beam frame, and 30 the reed, all of the features just enumerated being in themselves of ordinary well-known form, construction, and purpose and requiring no specific description herein, it being only necessary to state at this place that the warp-wires or threads 24 pass from the warp-beam 23 through the heddles 27 28 and reed 30 and thence in finished fabric around the breast-beam 26 and upon the cloth-beam 25 and that the lay-beam frame 29, carrying the reed 30, is pivotally supported at its upper end and has imparted to it the usual oscillatory motion toward the breast-beam 26 and then back to its normal position (shown in Figs. 2 and 3) in the rear of the path of the shuttle.

31 designates the power-shaft for the machine, this shaft, as shown in Fig. 4, being mounted in bearings 32 and having a normally loose band-wheel 33 adapted, through ordinary clutch mechanism 34, to be connected with the shaft 31 for imparting motion thereto. The main driving-shaft of the loom is numbered 35, and it is connected with the shaft 31 by the corresponding gear-wheels 36 37, one being fast on the shaft 31 and the other being loose on the shaft 35. The shaft 31 also communicates motion at the proper time to the shaft 38, Fig. 4, through the medium of intermeshing gear-wheels 39 and 40, the gear-wheel 40 being normally free on the shaft 38, but capable, as hereinafter explained, of being connected with said shaft so as to effect the rotation of the same. Under normal conditions and until the electric circuit, hereinafter explained, is completed the shaft 31, with the gear-wheels 36 37 and 39 40, may run idly without setting in motion any of the other operative parts of the loom, it being necessary when it is desired that the loom shall actively operate in the manufacture of the cloth that the mechanisms more directly connected with the parts thereof shall be set in motion through appropriate clutch mechanism from parts carried by or operated from the shafts 31, 35, and 38.

If it be assumed that by means of the clutch 34 the band-wheel 33 is connected with the shaft 31 and that power has been applied to the band-wheel 33, the operative parts of the machine will nevertheless remain at rest until, as hereinafter more fully explained, the electromagnet 41 is energized by the completion of the electric circuit through the same and pulls downward the short arm (the left-hand end looking at Fig. 4) of the bar 42 and has elevated the longer or other arm of said bar upwardly, said bar 42 being pivotally mounted, as at 43, and normally having its longer arm, which is beveled at one edge, in engagement with the projecting portion of a spring-pin 44, Figs. 8 and 9, mounted in a clutch-hub 45 adjacent to a clutch-wheel 46 on the shaft 31, the longer arm of the bar 42 when in its normal or lower position preventing the pin 44 from entering any of the series of apertures, Fig. 7, in the said clutch-wheel 46, and consequently preventing the rotation of the shaft 31 and clutch-wheel 46 from being communicated to the hub 45 and parts carried by said hub or operated therefrom. Under normal conditions the clutch-wheel 46 will rotate with the shaft 31, being fast thereon, but will be prevented from communicating motion to the hub 45 until the longer arm of the bar 42 has been elevated by the action of the electromagnet 41 to leave the pin 44 and allow the latter at its inner end to enter one of the apertures 47 in the clutch-wheel 46 and connect thereby said wheel and hub together. The hub 45, carrying the spring-pin 44 and the apertured clutch-wheel 46, are of usual construction and constitute simply one convenient and well-known form of pin-clutch. The elevation of the longer arm of the bar 42 by the action of the electromagnet 41 therefor permits the motion of the shaft 31 to be communicated to the hub 45, and the motion of this hub 45 is utilized through an arm 48, carried thereby, to elevate a pivoted arm 49, Fig. 4, for the purpose of permitting the pin of a clutch-hub 50 (fast on the shaft 35) to engage a clutch-wheel 51, loose on said shaft, and in one part with the gear-wheel 37, loose on said shaft 35. When the pivoted arm 49 is in its lower initial position, it prevents the pin of the clutch-hub 50 from connecting with the clutch-wheel 51, and hence when said arm 49 is in its lower position the gear-wheel 37 and clutch-wheel 51 may turn idly upon the shaft 35; but when the electromagnet 41 has acted and the arm 48 on the hub 45 of the shaft 31 has turned up under and elevated the pivoted arm 49 the pin of the clutch-hub 50 will at once engage the clutch-wheel 51 and at such time, said clutch-hub 50 being fast on the shaft 35, the motion of the shaft 31 will be communicated, through the gear-wheels 36 37, clutch-wheel 51, and clutch-hub 50, to the shaft 35, the latter being thus set in motion and enabled to communicate motion to the parts to be operated therefrom. The clutch-hub 50 and its pin and the clutch-wheel 51 correspond exactly with the clutch-hub 45 and clutch-wheel 46, (shown in detail in Figs. 7, 8, and 9,) and constitute simply one familiar form of pin-clutch. The driving-shaft 35 may stop at the end of any of its rotations, because at the end of each of its rotations the pin of the clutch-hub 50 passes into engagement with the beveled edge of the arm 49, which is only held in its upward position long enough for the said pin to connect with the clutch-wheel 51 and for said wheel to be started in motion. The bar 42 for the clutch-hub 45 and clutch-wheel 46 is only temporarily held in its elevated position, and hence the said hub 45 is at the end of each of its rotations automatically disconnected from the clutch-wheel 46 by the movement of the projecting end of the pin 44 against the beveled end of the arm 42, and it may be said that in the proper timing of the operative parts of the machine the hub 45 will be disconnected from the wheel 46 just in advance of the end of the rotation of the shaft 35.

Power is communicated from the shaft 31 to the shaft 38 through the gear-wheels 39 40 when a pivoted arm 52, Fig. 4, is elevated by the movement of an arm 53, carried by the shaft 35, the shaft 35 at each of its rotations carrying the arm 53 upward against the pivoted arm 52 to elevate the same and permit the pin 54 in the hub of a beveled gear-wheel 55 to enter one of the receiving-apertures in the face of the gear-wheel 40, said beveled gear-wheel 55 being fast on the shaft 38 and only receiving movement when its pin 54 locks it to the gear-wheel 40 upon the elevation of the pivoted arm 52. The pin 54 in the hub of the beveled gear-wheel 55 corresponds exactly with the pin 44 of the hub 45, and the apertures in the face of the gear-wheel 40 correspond exactly with the apertures 47 in the face of the clutch-wheel 46, (shown in Fig. 7,) and hence the said pin 44 and the apertures in the face of the gear-wheel 40 constitute simply a familiar form of pin-clutch requiring no special description. The motion of the shaft 31 is therefore only permitted to actuate the hub 45 and arm 48 when the electromagnet 41 is energized and elevates the longer arm of the bar 42 from the pin 44 of the hub 45, and then the shaft 35 remains at rest until the arm 48, carried by the hub 45, turns under and elevates the pivoted arm 49 to permit the connection of the clutch-hub 50 with the clutch-wheel 51, at which time the gear-wheel 37 may impart its movement to the shaft 35 and parts carried thereby. The shaft 38 and beveled gear-wheel 55 remain at rest until the arm 53 on the shaft 35 passes against and elevates the pivoted arm 52, which normally keeps the said wheel 55 from becoming locked by means of the pin 54 with the gear-wheel 40.

The lay-beam frame 29, the heddle-frames 27, 28, and cloth-beam 25 are operated from the shaft 35, and the carriage 56, carrying the electromagnets 57 for effecting the movement of the shuttle 58, receives its motion from the bevel gear-wheel 55 on the shaft 38 through suitable intermediate mechanism.

I will describe the means for imparting motion from the shaft 35 to the lay-beam frame 29. Upon the inner end of the shaft 35 is secured a crank-arm 59, to whose outer end is pivotally secured one end of a link 60, Fig. 3, the other end of which is pivotally connected with the toggle-levers 61 62, these levers being pivotally connected together and the lever 61 at its outer end being pivotally secured to a bracket mounted upon a stationary part of the general frame 20, while the outer forwardly-projecting end of the lever 62 is pivotally and substantially centrally secured to the lever 63, whose lower end is pivotally mounted in a bracket 64 and whose upper end is by means of a link 65 pivotally connected with a bracket carried by the lower portion of the lay-beam frame 29, as shown in Fig. 3. During each rotation of the shaft 35 the lay-beam frame 29 will have two movements in an outwardly direction imparted to it through the toggle-levers 61 62, the reed 30 first moving forwardly against the strand of wire laid by the shuttle when during the rotation of the shaft 35 the crank 59 moves the toggle-levers 61 62 into alinement with each other and then moving slightly rearwardly when the jointed ends of the levers 61 62 move upwardly beyond the plane of such alinement and then again moving outwardly during the descent of the toggle-levers 61 62 to their said alined position and then rearwardly to its initial position upon the descent of the meeting portions of the said toggle-levers to their lower position. (Illustrated in Fig. 3.) The reed 30 thus has imparted to it during each rotation of the shaft 35 a double outward movement against the strand or thread laid by the shuttle, this special movement of the frame 29 and reed 30 by means of the toggle-levers 61 62, lever 63, and link 65 being old and well understood in this art.

Intermediate the two outward movements or beats of the reed 30 during each rotation of the shaft 35 the heddle-frames 27 28, which are of usual construction, change their positions in the ordinary manner. The heddle-frames 27 28 are at their upper edges connected by bands 66, passing over pulleys 67, as shown in Figs. 1, 2, and 3, and the lower ends of said frames 27 28 are connected, as usual, by sprocket-chains 68, passing over sprocket-wheels 69, the bands 66 and chains 68 serving to maintain the due relationship of the heddle-frames to each other and to sustain and guide said frames during their movements. The heddle-frames receive their movements through a rock-shaft 70, Fig. 2, having at one end a crank-arm 71, connected by a link with the heddle-frame 27 and adjacent to its other end being provided with a depending crank-arm 72, whose lower end is confined within the grooves of the cam 73, secured on the driving-shaft 35, this cam 73 having its grooves crossing each other, so as to accomplish the shifting of the lower end of the arm 72 from one of said grooves into the other thereof and the rocking thereby of the shaft 70 for the purpose of, through the crank-arm 71, imparting the usual movement to the heddle-frames. The cam 73 is illustrated in Fig. 4 and is of well-known form and construction, and Fig. 5 shows the connection of the arm 71 to the frame 27. After the lay-beam frame 29 has completed its double outward movement the cloth-beam 25 will receive its motion from the shaft 35 through intermediate mechanism. (Illustrated more clearly in Fig. 2.)

Upon the right-hand end of the shaft of the cloth-beam 25 is secured a gear-wheel 74, engaged by an intermediate gear-wheel 75, which receives its motion from a pinion-wheel 76, mounted upon a shaft with a larger pinion-wheel 77, which is engaged by the worm 78, secured upon the forward end of a shaft 79, whose rear end carries a star-wheel 80, this wheel being disposed in proper relation to the crank-arm 53, carried by the shaft 35, to have an intermittent motion imparted to it by the engagement of said arm 53 with one of the arms of said wheel 80 during each rotation of the shaft 35. The star-wheel 80 is of usual form and construction and is shown in detail in Fig. 10. The cloth-beam 25 has an intermittent motion imparted to it, said beam being given a slight rotary motion with each complete rotation of the shaft 35. During each rotation of the shaft 35 the arm 53 thereon will turn against one of the arms of the star-wheel 80 and impart a limited rotary movement to said wheel, and this movement of the wheel 80 will be transmitted through the shaft 79, worm 78, pinion 77, pinion 76, and intermediate gear-wheel 75 to the gear-wheel 74 and cloth-beam 25.

Immediately following the actuation of the star-wheel 80 by means of the crank-arm 53 on the driving-shaft 35 the reduced outer end of said arm 35 will ride up under and elevate the rear end of the pivoted arm 52 for enabling the engagement of the bevel gear-wheel 55 with the gear-wheel 40 on the shaft 38 for the purpose of enabling said bevel gear-wheel 55 through the intermediate connections provided to effect the movement of the carriage 56, carrying the electromagnets 57, which serve to move the shuttle 58. The bevel gear-wheel 55 is in constant mesh with a bevel gear-wheel 81, Fig. 4, mounted upon the inner or rear end of a crank-shaft 82, whose crank-pin 83 is connected by a link 84, Fig. 5, with a bell-crank lever 86, having a segment-gear 87 on one arm in engagement with a pinion 88 on the shaft 89, carrying a sprocket-wheel 90, Figs. 1 and 5, which wheel 90 engages the endless sprocket-chain 91 for moving the carriage 56. The sprocket-wheel 90 is given a rotary motion first in one direction and then in the opposite direction, and hence is enabled to move the carriage 56 first to one side of the loom and then to the other side thereof. The gear-wheel 81 will be twice as large as the gear-wheel 55 driving it, and hence with one full rotation of the gear-wheel 55 the wheel 81 only makes a half-turn. Thus the carriage 56 during each rotation of the driving-shaft will simply make one movement from one side to the other of the loom, the movement of said carriage back to its initial position taking place during the succeeding rotation of said driving-shaft.

The carriage 56 is mounted upon a track 92, extending across the loom, and the said carriage 56 is provided with small wheels 93 to electrically engage and travel upon track-rails 94, secured upon said track 92. In the present instance the carriage 56 is formed with a central depending lug 95, which enters a groove in the track 92 and has connected to its opposite ends the ends of the sprocket-chain 91, so that said sprocket-chain when moving in one direction may pull the carriage 56 with it and when moving in the opposite direction may also at such time pull the carriage with it. The sprocket-chain 91 passes over the driving sprocket-wheel 90, thence over the smaller intermediate sprocket-wheel 96, and then over the small sprocket-wheels 97, secured adjacent to the ends of the track 92. The carriage 56 is simply a plain flat frame carrying the electromagnets 57, there being in the present instance two of said magnets at each end of the carriage, and these magnets become energized by the electric current passing through the rails 94 and wheels 93. In Fig. 1 I illustrate the carriage 56 at an intermediate position, and it is to be understood that the carriage 56 will complete its movement before the lay-beam frame 29 moves outwardly and that when the carriage 56 is at the end of its movement it will be at a position of rest on that portion of the track 92 extending laterally beyond the side of the main frame 20 of the loom. From what has been said it will be understood that upon the rotation of the bevel gear-wheel 55 the bevel gear-wheel 81 will perform one-half of a rotation, and that during this one-half rotation the said wheel 81 will, through its crank-pin 83, the link 84, bell-crank 86, segment-gear 87, pinion 88, sprocket-wheel 90, and sprocket-chain 91, cause the carriage 56 to travel from one end of its track 92 to the other end thereof, and that upon the following rotation of the bevel gear-wheel 55 the bevel gear-wheel 81 will perform a further half-rotation and at this time through the intermediate devices referred to reverse the movement of the sprocket-chain 91 and cause the carriage 56 to travel back to the end of the track 92 from which it started. During each rotation of the driving-shaft 35 the bevel gear-wheel 55 performs but one rotation.

The track 92 for the carriage 56 is directly below the race 98 for the shuttle 58 when the lay-beam frame 29 is in its initial position, as shown in Figs. 2 and 3. The race 98 is a plain metallic plate carried by the lay-beam frame 29 and adapted when said frame 29 is in its rear or initial position to lie close against the lower side of the warp wires or threads and to permit the shuttle 58 to travel over it and between the then separated or diverging warp wires or threads. The race 98 is secured upon the forwardly-projecting ends of a pair of arms 99, (shown in detail in Fig. 13,) secured by pivots 100 upon the sides of the lay-beam frame 29 and at their inner or rear ends pivotally connected with the suspended pivoted rods 101. I do not limit the invention to the securing of the race 98 to the pivoted arms 99; but I recommend that the said race be thus pivoted, so that during the outward or forward motion of the frame 29 the said race may tilt downwardly from the cloth. In the present instance when the lower portion of the frame 29 moves frontward the rods 101, not moving on the same center as the frame 29, will operate to draw upwardly on the inner or rear ends of the pivoted arms 99, and thus tilt the race 98 downwardly from the cloth. When the frame 29 and race 98 start inwardly to their initial position, the rods 101 operate to press downwardly on the inner or rear ends of the arms 99, and thereby turn the race 98 upwardly in close relation to the warp wires or threads 24, where said race will be in position to enable the shuttle 58 to perform another movement.

The shuttle 58 carries the bobbin 202 for the wire to be by said shuttle carried between the warp-wires 24, and the shuttle 58 is given its movement entirely from the electromagnets 57, mounted on the carriage 56. In Figs. 13, 14, and 15 I illustrate, on an enlarged scale, the shuttle 58, its race 98, and the electromagnets 57 for driving said shuttle. The shuttle 58 comprises an oblong frame 102 and armature-rollers 103, carrying said frame 102. The rollers 103 are in the present instance in pairs, one pair of rollers being at each end of the frame 102 and the rollers of each pair being connected by side bars 104, which are intermediate the rollers connected by a transverse bar 105, which is pivoted to the outer end of an arm 106, secured to the ends of the frame 102. The side bars 104, connecting the shafts of the rollers 103, preserve the proper relation of the rollers to each other and with the rollers constituting a truck at each end of the frame 102 for carrying the latter. The side bars 104 for the rollers 103 are pivotally secured to depending ends of the transverse bar 105, as shown in Fig. 14, and hence the said bars 104 may during the travel of the shuttle have whenever necessary a slight rocking motion without necessarily tilting the frame 102. I employ two of the armature-rollers at each end of the shuttle 58, because in the construction presented the carriage 56 carries two pairs of electromagnets 57 at each of its ends. The electromagnets 57 act through the race 98 upon the armature-rollers 103 and cause said rollers carrying the entire shuttle 58 to follow them during their movement below the race 98. The rollers 103 move between the diverging warp threads or wires 24, and hence it is desirable that said rollers shall not mar said wires or in any way disturb them, and in the present instance I provide the rollers 103 adjacent to their ends with bands 107, of rubber, felt, or like material, which will keep the body of the rollers 103 from direct contact with the warp-wires. The bands 107 perform in use two very important functions, one being to prevent the rollers 103 from in any way marring or disturbing the warp-wires and the other being to enable said rollers and the entire shuttle to travel on a correct path over the race 98 instead of running off of such path. The softness of the bands 107 are relied upon to prevent the marring of the warp-wires; but the capability of the rollers 103 to travel upon their proper path over the race 98 is due to the exterior surfaces of said bands 107 being to a certain extent rough in character, whereby during the movement of the shuttle the armature-rollers may have a limited vertical bouncing action imperceptible to the eye during the travel of the shuttle, this limited vertical movement of the armature-rollers enabling the magnetic field to retain the rollers directly over the race 98, the rollers after starting to leave their path over the race 98 being during their slight vertical movement or bouncing action rendered capable in connection with the magnetic field of regaining their true path over the race 98. It has been found that when perfectly-smooth armature-rollers 103 are employed they may during the travel of the shuttle diverge from their path over the race 98 and that when a rough surface is applied to said rollers the latter will not leave their true path over the race 98, but will follow the line of travel of the electromagnets 57. The fact that the side bars 104, connecting the rollers 103, are pivotally secured to the depending ends of the transverse bar 105 and that the bar 105 is secured by a vertical pin or pivot to the arm 106 enables the rollers to have a duplex pivotal action which aids in accomplishing the correct movement of the shuttle and of rendering said rollers capable of keeping within the magnetic field of the electromagnets 57 below the race 98.

Adjacent to the opposite ends of the race 98 the frame of the machine is provided with suitable supports 108, upon which the shuttle 58 will pass after leaving the warp-wires 24 and race 98, these supports 108 being disposed beyond the path of the lay-beam frame 29 and adapted to receive the shuttle 58 at the ends of its line of travel.

In accordance with my present invention I mount upon the supports 108 at each side of the machine a plunger-rod 109, Fig. 15, to be engaged by the end roller 103 at the termination of the line of travel of the shuttle and having at its outer end the spring-contact 110, which normally is by means of a coiled spring 111 held in an inoperative position, but which when the rod 109 is struck by the roller 103 of the carriage is by means of said roller pushed outwardly until the opposite bent ends of said spring-contact 110 are between the contact-plates 112 over the outer end of said supports 108, the mechanism shown in Fig. 15 being duplicated at each side of the loom adjacent to the ends of the race 98. The rod 109 is mounted to slide in apertures in the transverse bars 113, and the contact-plates 112 are in electric circuits, which are completed when the spring-contact 110 is between them, but which are broken when said contact 110 is not between them, or in the position in which it is shown in Fig. 15. When the shuttle upon reaching the end of its movement runs against the end of the rod 109 and drives the spring-contact 110 between the contact-plates 112, the circuit is then made through said plates and spring-contact, as may be understood upon reference to Fig. 6; but when during the succeeding throw of the shuttle 58 the latter leaves the rod 109 the spring 111 will drive the said rod in an inward direction toward the middle of the loom and withdraw the spring-contact 110 from between the contact-plates 112, and at such time the circuit through said plates and spring-contact 110 will of course be broken. The shuttle 58 upon arriving at one end of its line of movement will therefore drive one rod 109 to carry its spring-contact 110 between the plates 112 at one side of the loom and upon arriving at its other end of movement will drive the other rod 109 to carry its spring-contact 110 between the plates 112 to form the circuit at that side of the loom. The shuttle 58 will thus upon arriving at each end of its line of movement complete an electric circuit and upon leaving each end of its line of movement will break the circuit connections completed by it. The effect of this making and breaking of the electric-circuit connections by the shuttle 58 when over the supports 108 will be explained hereinafter.

Upon the arrival of the shuttle 58 at the ends of its line of travel and the movement outward of the reed 30 the bobbin 202 for the wire carried by the shuttle should be placed under control, so that during the outward movement of the reed 30 the wire extending from the bobbin and between the warp-threads may be straightened or placed under tension and prevented from kinking, and to this end I provide over the supports 108 presser-blocks 114, (shown in detail in Figs. 11 and 12,) which at the proper time during the outward movement of the lay-beam will descend upon the bobbin of wire in the shuttle and prevent the turning of the bobbin under the strain placed upon the wire by the outward movement of the lay-beam frame. The presser-blocks 114 are carried by pivoted arms 115, loosely held upon the end of a rock-shaft 116, carrying a short crank-arm 117, provided with a pin 118, passing directly below the edge of the arm 115. Each arm 115 is given a normal downward tension by means of a coiled spring 119, said spring drawing the arm 115 downward against the pin 118. The movement of the rock-shaft 116 is controlled by a vertically-extending arm 120, Fig. 1, extending upwardly and having an inwardly-bent upper end engaging the rear edges, Fig. 2, of the sides of the lay-beam frame 29. When the lay-beam frame 29 is in its rear initial position, it bears against the upper inwardly-bent ends of the rods 120 and holds the rock-shafts 116, arms 117, and pins 118 in the position in which they are shown in Fig. 2, the pins 118 at such time holding the arms 115 and blocks 114 in their upper position in opposition to the force exerted by the springs 119, and under such condition of the parts the shuttle 58 is enabled to freely pass under the blocks 114. After the shuttle 58 has completed one of its movements and the lay-beam frame has moved outwardly the upper ends of the rods 120 are enabled to tilt forwardly, following the sides of the lay-beam frame, and this enables the presser-blocks 114 to descend with the pins 118 under the action of the springs 119. When the lay-beam frame 29 is reaching its extreme forward position, the tilting of the rods 120 is such that the pins 118 leave the lower edges of the presser-block arms 115, and at such time the springs 119 are permitted to exert their entire force in holding the blocks 114 firmly upon the bobbin in the shuttle. During the outward movement of the lay-beam frame against the strand laid by the shuttle the edge or corner of said beam will move against said strand then inclining toward the shuttle and move the same outwardly against such resistance as the bobbin may afford, and it is during this part of the operation that the presser-block 114 descends upon the bobbin, it being my purpose that after the lay-beam frame has moved outwardly to a sufficient extent to gather all of the slackness in the wire necessary the presser-block 114 shall descend upon the bobbin and hold it rigidly against rotation, so that during the final part of the outward movement of the lay-beam frame there will remain no slackness or kinks in the wire. When the lay-beam frame recedes to its inner initial position, its sides acting upon the upper inwardly-bent ends of the rods 120 will, through the rock-shafts 116, arms 117, and pins 118, elevate the presser-blocks 114 to their upper inoperative position.

The warp-wires must be kept under a proper tension and the unwinding of said wires from the beam 23 properly controlled, and the mechanism (more clearly shown in Figs. 1, 2, and 3) whereby these purposes may be accomplished will now be described in order that an operative loom may be presented; but said mechanism is not claimed herein, the same being an independent invention and having been made the subject of a separate application, Serial No. 155,468, filed May 4, 1903, for Letters Patent.

Upon the right-hand end of the shaft of the warp-beam 23 is secured a sprocket-wheel 121, Fig. 2, which is connected by a sprocket-chain 122 with a sprocket-wheel 123 upon the right-hand end of a shaft 124, extending transversely across the upper end of the loom-frame and having upon its left-hand end, Fig. 3, a sprocket-wheel 125, upon which is looped the sprocket-chain 126, this chain 126 being endless and passing downward from the left-hand edge (looking at Fig. 3) of the wheel 125 around a pulley-wheel 127, thence upwardly over a small sprocket-wheel 128, thence downwardly from the left-hand edge of said wheel 128 and upwardly along the right-hand edge of the large sprocket-wheel 125. The small sprocket-wheel 128 is formed upon or connected with a band-wheel 129, over which a flexible band 130 passes, the band 130 at one end being fastened to the pivot-point 131 of a lever-arm 132, while the other end of said band 130 is fastened to said lever-arm 132 at the point 133, which is slightly removed from the pivot-point 131 for said lever. The lever 132 is pivoted to the frame of the loom at the point 131 and at its forward or free end is given a tension downwardly by reason of a coiled spring 134, which spring may or may not be used, as may be preferred, the same not being essential to the successful operation of the loom. To the lever 132 is pivotally secured the upper end of a rod 135, whose lower end is slotted, as shown in Fig. 3, and passes upon the pin 136 of the pulley-wheel 127. The pulley-wheel 127 is connected with a pivoted arm 137, which aids in keeping said wheel in about a given relation to the adjoining portion of the loom-frame and allows said wheel to have a limited vertical movement. A strap 138 is suspended from the pin 136 of the pulley-wheel 127, and from this strap 138 is suspended a rod 139, upon which may be strung any suitable number of weights 140, these weights serving to pull downward on the pulley-wheel 127 and sprocket-chain 126 and resisting the unwinding motion of the warp-beam 23, thereby placing the warp wires or strands 24 under a tension. The number of weights 140 employed will vary with circumstances; but a suficient weight will be employed to place the warp-strands 24 under the required tension. During the winding of the cloth upon the cloth-beam 25 the warp-beam 23 must give off from time to time the warp-wires 24, and during the unwinding motion of the warp-beam 23 the weights 140 may by the pull exerted on the chain 126 by the wheel 125 become gradually elevated; but it is my purpose to prevent the weights 140 from traveling upwardly to any undue extent, and in the construction presented the upward movement of the weights 140, due to the action of the sprocket-wheel 125 turning upwardly and toward the front, on the chain 126 will be continued only until the pin 136 of the pulley-wheel 127 reaches the upper end of the slot in the lower end of the rod 135 and turns the lever 132 upwardly to a suciffient extent to loosen the band 130 upon the wheel 129, upon the happening of which the wheel 129 and small sprocket-wheel 128 will be free to turn and will pay out a limited amount of the chain 126 to the pulley-wheel 127, and thus allow the weights 140 to again move downwardly to the limit of motion permitted by the slot in the lower end of the rod 135. When during the descent of the weights 140 the pin 136 engages the lower end of the rod 135, said rod will be pulled downwardly by said weights and tighten the band 130 upon the band-wheel 129. The small sprocket-wheel 128 will pay out the chain 126 when the band 130 is released in the same proportion that the wheel 125 has wound up said chain. The band 130 operates as a brake, and it prevents the wheel 129 and sprocket-wheel 128 from turning so long as the weights 140 are exerting their force against the chain 126; but upon a release of the band 130 from the wheel 129 by the upward movement of the rod 135 the wheel 129 may rotate and pay out the chain 126. The upward movement of the weights 140 may be mechanically accomplished at each rotation of the driving-shaft 35, although this is an alternate method of operation to which I do not limit my invention, but which I consider desirable. For the purpose of elevating the weights 140 momentarily at each rotation of the shaft 35 I mount at the rear of the general frame 20 a rock-shaft 141, having the crank-arm 142 at its left-hand end in position to pass up under and elevate the weights 140, while at the other end of the said rock-shaft 141 is provided a similar crank-arm 143, Fig. 2, in position to be engaged by the projecting portion of a cam 144, mounted on the shaft 35. During each rotation of the shaft 35 the cam 144 will move upwardly against the crank-arm 143 and turn the rock-shaft 141 sufficiently for the arm 142 at its left-hand end to move upward against and elevate the weights 140, thus momentarily taking the strain of the weights off of the warp-wires and allowing the cloth-beam 25 to wind and the warp-beam 23 to unwind. The employment of the rock-shaft 141 and crank-arm 142 to elevate the weights 140 enables me to at the proper time take the strain of the weights 140 off of the warp-wires 124, and when the rock-shaft 141 and its arm 142 are not employed the strain of the weights 140 remains on the warp-wires 24. With each elevation of the weights 140 by means of the rock-shaft 141 and crank-arm 142 the brake-band 130 is momentarily loosened on the band-wheel 129 and the sprocket-wheel 128 may pay out the chain 126 in the same proportion as the chain is taken up by the wheel 125, this loosening of the band 130 having the same effect as the loosening of the band 130 by the upward movement of the weights 140 when the crank-arm 142 is not employed. In accordance with either method of utilizing the weights 140, chain 126, sprocket-wheel 127, sprocket-wheel 128, band-wheel 129, and brake-brand 130 the weights 140 will be prevented from elevating to any substantial extent, and said weights will at all times be enabled to create the proper tension upon the warp-wires 24.

The heddle-frame 28 is at its right-hand end connected by a rod 145 with a pivoted switch-arm 146, Fig. 3, which is adapted to engage either of two spring-contacts 147 148, said arm 146 being shown as being in electrical connection with the contact 147, and this is the correct position of the switch-arm 146 when the heddle-frame 28 is in its upper position. The switch-arm 146 is pivotally mounted at its rear end on a pin which enters a part of the side 22 of the general frame of the loom. When the heddles change positions and the frame 28 descends, it will, through the rod 145, pull downward on the forward end of the switch-arm 146 and carry the same into electrical connection with the contact 148. When the switch-arm 146 is in its upper position, (shown in Fig. 3,) an electric circuit will be formed through said switch and the contact 147, and when the heddle-frame 28 moves downwardly said circuit will be broken and another circuit formed through said arm 146 and the contact 148. I make use of the heddles for operating the switch-arm 146 as a matter of convenience and because the breaking of one circuit and the forming of another circuit should take place at the time of the movement of the said heddles.

In Fig. 6 I illustrate the electric circuits in a diagrammatic manner, the switch-arm 146 being represented as adapted to make a circuit through the contact 147 or through the contact 148. A conductor 149 passes from the switch 146 to the electromagnets 41, and from the electromagnets 41 a conductor 150 passes to one of the track-rails 94. The conductor 151 passes from the contact 148 to one of the contact-plates 112 at one side of the loom, and a conductor 152 passes from the corresponding contact-plate 112 at the same side of the loom to the other track-rail 94, and there is normally a break between the conductors 151 152, due to the space between the corresponding plates 112; but the continuity of the circuit through the conductors 151 152 is secured when the spring-contact 110 passes between said plates 112, as hereinbefore explained. From the contact 147 a conductor 153 passes to one plate 112 at the other side of the loom, and from the corresponding plate 112 at that side of the loom a conductor 154 passes to the outer track-rail 94, to which the conductor 152 passes. The track-rails 94 are connected with the main line or supply by conductors 155 156, Fig. 13.

The operation of the several parts of the loom will be largely understood from the foregoing description, and hence a further detailed explanation of the operation will not be required. It may be said, however, that the lay-beam, the reed, and the heddles perform in the present loom their ordinary heretofore-known functions in a usual way. If it be assumed that power has been applied to the shaft 31 and that the current is upon the conductors leading to the track-rails 94, with the heddle-frames in the position in which they are shown in Fig. 3 and the shuttle over one of the supports 108, holding the spring-contact 110 between a pair of the contact-plates 112, the electromagnet 41 will then be in the electric circuit represented in Fig. 6 and will become energized and draw downward on the short arm of the bar 42 and elevate the longer arm of said bar from the pin 44 of the clutch-hub 45, this permitting the pin 44 to become connected with the clutch-wheel 46, whereupon the said hub will rotate with said wheel and with the shaft 31 and carry its arm 48 upwardly against the pivoted arm 49 and allow the clutch-wheel 51 to become connected with the clutch-hub 50 on the shaft 35, setting said shaft 35 in motion. The operation of the several parts of the loom from the shaft 35 has been fully described hereinbefore, and this description need not be repeated. Thus the energizing of the electromagnet 41 takes place when a circuit is completed through the switch-arm 146 and the shuttle 58 is over one of the supports 108, with its spring 110 between a pair of the plates 112, and when the electromagnet 41 has become thus energized it will by acting on the armature-bar 42 effect the starting in motion of the several parts of the loom to be actuated from the shafts 35 and 38. The carriage 56 and shuttle 58 will perform their movements when the lay-beam frame is in its rear or initial position, (shown in Fig. 2,) and the heddles will change their position at a period intermediate the two outward beats of the lay-beam frame, and after the second beat of the lay-beam frame the star-wheel 80 is set in motion by the arm 53 for winding the cloth-beam 25.

From what has been said it will be apparent that to set the loom into operative action the electromagnet 41 must become energized and that the electric circuit through said magnet is completed when the switch-arm 146 is in contact with one or the other of the contacts 147 148 and the spring 110 over one of the supports 108 is in engagement with a pair of the plates 112. In Fig. 3 the switch-arm 146 is shown in electrical engagement with the contact 147, and when the heddles change position the heddle-frame 128 will move the switch-arm 146 downward, breaking the circuit at the contact 147 and establishing a connection with the contact 148. The circuit energizing the magnet 41 is broken by the movement of the heddles and is also broken by the travel of the shuttle from over one of the supports 108 and along the race 98 to the other support 108, because as soon as the shuttle leaves one of the supports 108 the spring-contact 110 at that support will be withdrawn from the plates 112 by the spring 111. The movement of the switch-arm 146 from the contact 147 to the contact 148 and the movement of the shuttle 58 from over one of the supports 108 at one side of the machine to the support 108 at the other side thereof (this other side being represented by the lower portion of Fig. 6) will reëstablish a circuit through the conductor 151 and reënergize the magnet 41; but the said magnet 41 will not become reënergized until the shuttle has completed its movement and forced the spring-contact plate 110 between the pair of plates 112. Thus for each rotation of the driving-shaft 35 the electromagnet 41 must be reënergized, and in the absence of this taking place the driving-shaft 35 will stop at the end of a rotation. This is an important feature of the operation, because the lay-beam frame will not be able to carry its reed outwardly until the circuit has been completed by the shuttle reaching the end of its line of travel, and consequently should for any reason an accident happen which would leave the shuttle intermediate the warp-threads 24 and over the race 98 the lay-beam frame could not move forwardly, and consequently no ill effects would ensue—such, for illustration, as the breaking of the loom or destruction of the wire-cloth. During the first rotation of the shaft 35 on starting the loom the lay-beam frame 29 will be caused or permitted to make its outward movement without the shuttle having traversed the race 98; but when during said rotation the frame 29 has receded to its initial position the shuttle will make its movement along said race and lay the strand, so that at the end of each rotation of the shaft 35 the frame 29 will be in its rear position and the shuttle will have traversed the race 98. In the absence of an accident there will be no cessation in the movement of the driving-shaft 35, because at the end of each throw of the shuttle the electric circuit will be established through and reënergize the magnet 41. The circuit through the magnet 41 is broken at each rotation of the shaft 35 and well before the end of the rotation of such shaft by the movement of the heddle-frames and switch-arm 146, and this occurs before the shuttle starts on its movement over the race 98, and the circuit does not become reëstablished through the magnet 41 until the shuttle has reached the end of its line of travel and completed the connections for such circuit. The breaking of the electric circuit through the magnet 41 will not affect the electromagnets 57, because they are in a circuit across the tracks 94, and hence are always in condition to compel the movement of the shuttle.

The effect of the weights 140 is to place the proper tension on the warp-strands, and these weights when mounted and controlled as hereinbefore described will maintain said tension with substantial uniformity. The mechanical lifting of the weights 140 to take the tension off of the warp-strands as the cloth is wound upon the cloth-beam is of advantage, because by reason thereof the movement of the cloth over the breast-beam is facilitated and the danger which would arise of rubbing or injuring the cloth by moving it while under tension over the breast-beam is avoided. This same result is accomplished, though probably in not so satisfactory a manner, by the movement upward of the weights 140 to relieve the brake-band 130 without the aid of the crank-arm 142.

The pivoting of the trucks at the ends of the shuttle renders the latter flexible and more easily controllable.

What I claim as my invention, and desire to secure by Letters Patent, is—

1. In a loom, the warp and cloth beams, and the lay-beam frame, combined with the race carried by said frame, means for moving said race downwardly from the warp-strands during the outward movement of said frame and upwardly during the receding movement of said frame, the shuttle adapted to travel between the warp-strands and over said race, the carriage having the electromagnets below said race, the track for said carriage, and means for moving said carriage back and forth on said track for compelling the travel of said shuttle; substantially as set forth.

2. In a loom, the warp and cloth beams, and the lay-beam frame, combined with the race carried by said frame, the arms 99 pivoted to said frame and supporting the said race at its inner edge, the rods 101 pivotally suspended and connected with said arms 99 for moving the latter and said race during the outward and inward movement of said frame, the shuttle adapted to travel between the warp-strands and over said race, the carriage having the electromagnets below said race, the track for said carriage, and means for moving said carriage back and forth on said track for compelling the travel of said shuttle; substantially as set forth.

3. In a loom, the warp and cloth beams, the lay-beam, the race, the shuttle adapted to carry the bobbin between the warp-strands and over said race, and means for engaging the bobbin when the shuttle is at the end of its movement and the lay-beam frame has started forward for preventing said bobbin from paying out, whereby the lay-beam frame during its outward movement may place a tension on the strand and remove all kinks therefrom, combined with the carriage having the electromagnets below said race, the track for said carriage, and means for moving said carriage back and forth on said track for compelling the travel of said shuttle; substantially as set forth.

4. In a loom, the warp and cloth beams, the lay-beam, the race, the shuttle adapted to carry the bobbin between the warp-strands and over said race, and means operable from the lay-beam frame for engaging the bobbin when the shuttle is at the end of its movement and the lay-beam frame has started forward for preventing said bobbin from paying out, whereby the lay-beam frame during its outward movement may place a tension on the strand and remove all kinks therefrom, combined with the carriage having the electromagnets below said race, the track for said carriage, and means for moving said carriage back and forth on said track for compelling the travel of said shuttle, substantially as set forth.

5. In a loom, the warp and cloth beams, the lay-beam frame, the race, the shuttle adapted to carry the bobbin between the warp-strands and over said race, and means at each end of the line of travel of the shuttle for engaging the bobbin during the outward movement of the lay-beam frame for preventing said bobbin from paying out, said means comprising the presser-blocks 114, the pivoted arms 115 carrying said blocks, the rock-shafts 116 carrying the crank-arms 117 having pins 118 below said arms 115, and the rods 120 connected with said rock-shafts and engaging the edges of the lay-beam frame to be controlled in their position by said frame, combined with the carriage having the electromagnets below said race, the track for said carriage, and means for moving said carriage back and forth on said track for compelling the travel of said shuttle; substantially as set forth.

6. In a loom, the warp and cloth beams, the lay-beam frame, the race, the shuttle adapted to carry the bobbin between the warp-strands and over said race, and means at each end of the line of travel of the shuttle for engaging the bobbin during the outward movement of the lay-beam frame for preventing said bobbin from paying out, said means comprising the presser-blocks 114, the pivoted arms 115 carrying said blocks, the springs exerting a downward tension against said blocks, the rock-shafts 116 carrying the crank-arms 117 having pins 118 below said arms 115, and the rods 120 connected with said rock-shafts and engaging the edges of the lay-beam frame to be controlled in their position by said frame, combined with the carriage having the electromagnets below said race, the track for said carriage, and means for moving said carriage back and forth on said track for compelling the travel of said shuttle; substantially as set forth.

7. In a loom, the warp and cloth beams, the lay-beam frame, the race, the shuttle adapted to carry the bobbin between the warp-strands and over said race, presser-blocks at the ends of the line of travel of said shuttle for descending upon the bobbin therein during the outward movement of the lay-beam frame for preventing said bobbin from paying out, and means for actuating said blocks, combined with the carriage having the electromagnets below said race, the track for said carriage, and means for moving said carriage back and forth on said track for compelling the travel of said shuttle; substantially as set forth.

8. In a loom, the warp and cloth beams, the lay-beam frame, the race, the shuttle adapted to carry the bobbin between the warp-strands and over said race, presser-blocks at the ends of the line of travel of said shuttle for descending upon the bobbin therein during the outward movement of the lay-beam frame for preventing said bobbin from paying out, springs normally drawing said blocks in a direction toward the bobbin, and means during the receding motion of the lay-beam frame for elevating said blocks, combined with the carriage having the electromagnets below said race, the track for said carriage, and means for moving said carriage back and forth on said track for compelling the travel of said shuttle; substantially as set forth.

9. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from said heddles on their movement to break said circuit, and means operable by the shuttle on completing its movement for reestablishing said circuit and reënergizing said electromagnet for continuing the loom in operation; substantially as set forth.

10. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from a moving part of the loom for during each operation of the latter breaking said circuit, and means operable by the shuttle on completing its movement for reëstablishing said circuit and reënergizing said electromagnet for continuing the loom in operation; substantially as set forth.

11. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from a moving part of the loom for during each operation of the latter breaking said circuit, and means for, on the completion of the travel of said shuttle, reëstablishing said circuit and reënergizing said electromagnet for continuing the loom in operation; substantially as set forth.

12. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from said heddles on their movement to break said circuit, and means for, on the completion of the travel of said shuttle, reëstablishing said circuit and reënergizing said electromagnet for continuing the loom in operation; substantially as set forth.

13. In a loom, the warp and cloth beams, the lay-beam frame, the heddles, the shuttle, the carriage carrying the electromagnets for compelling the travel of said shuttle between the warp-strands, the track-rails for said carriage in the electric circuit therewith, and means for moving said carriage, combined with a power-shaft, means operable therefrom for setting in motion the several parts of the loom, an electromagnet for controlling the transmission of power from said shaft, an electric circuit including said electromagnet, means operable from said heddles on their movement to break the circuit through said controlling-magnet without affecting the circuit through said track-rails, and means operable by the shuttle on completing its movement for reëstablishing said circuit and reënergizing said controlling-magnet for continuing the loom in operation; substantially as set forth.

14. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from said heddles on their movement to break said circuit, contact-plates 112 at each end of the path of said shuttle, and a movable contact or switch 110 adjacent to said plates at each end of the line of travel of said shuttle to be moved by said shuttle upon the latter reaching the end of its line of travel into electrical connection with said plates 112 for reëstablishing said circuit and reënergizing said electromagnet for continuing the loom in operation; substantially as set forth.

15. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from a moving part of the loom for during each operation of the loom breaking said circuit, contact-plates 112 at each end of the path of said shuttle, and a movable contact or switch 110 adjacent to said plates at each end of the line of travel of said shuttle to be moved by said shuttle upon the latter reaching the end of its line of travel into electrical connection with said plates 112 for reëstablishing said circuit and reënergizing said electromagnet for continuing the loom in operation; substantially as set forth.

16. In a loom, the warp and cloth beams, the lay-beam frame, the heddles, the shuttle, and means for compelling the travel of the shuttle between the warp-strands, combined with a power-shaft, means operable therefrom for setting in motion the several parts of the loom, an electromagnet for controlling the transmission of power from said shaft, an electric circuit including said electromagnet, means operable from a moving part of the loom for during each operation of the latter breaking said circuit, the contact-plates 112 at each end of the line of travel of said shuttle, the rod 109 at each end of the line of travel of the shuttle carrying the contact-switch 110 to be moved into electrical engagement with said plates 112, and the spring normally retaining the switch 110 from engagement with said plates 112, said rod 109 being in the path of said shuttle and adapted to be struck thereby when said shuttle is reaching the end of its line of travel, for the purpose of reëstablishing said circuit and reënergizing said electromagnet; substantially as set forth.

17. In a loom, the warp and cloth beams, the lay-beam frame, the heddles, the race, the shuttle, and means for compelling the travel of the shuttle over said race and between the warp-strands, combined with a power-shaft, means operable therefrom for setting in motion the several parts of the loom, an electromagnet for controlling the transmission of power from said shaft, an electric circuit including said electromagnet, the switch-arm 146 connected with and adapted to be moved by one of said heddles, the electric contacts 147, 148, for said switch-arm, the contact-plates 112 at each end of the line of travel of said shuttle, the movable switch-contact plate 110 at each end of the line of travel of said shuttle and normally out of engagement with said plates 112, electric conductors passing from said contact 147 to one of said plates 112 at one side of the loom and from said contact 148 to one of said plates 112 at the other side of the loom, conductors passing from the other of said plates 112 at the opposite sides of the machine, and the conductors passing from the line to said controlling-magnet and from said controlling-magnet to said switch-arm 146, the shuttle upon reaching the end of its line of travel being adapted to establish a circuit through said controlling-magnet by compelling the engagement of one of the switch-contact plates 110 with the pair of plates 112, and the heddles upon their movement being adapted by moving the switch-arm 146 to break the circuit at one of its contacts and arrange at the other of its contacts for the reëstablishment of said circuit and the reënergizing of said electromagnet upon the engagement by means of the shuttle of the switch-contact 110 with a pair of said plates 112; substantially as set forth.

18. In a loom, the warp and cloth beams, the lay-beam frame, and the race, combined with the shuttle, and means for holding said race up against the warp-strands during the travel of said shuttle over the same and then lowering said race from said strands; substantially as set forth.

19. In a power-loom, the warp and cloth beams, the lay-beam frame, the shuttle, and means for moving said shuttle between the warp-strands, combined with means adapted to automatically cut off the power from the lay-beam frame after each of its movements until the shuttle has completed its stroke, and means operable by said shuttle upon reaching the end of its line of travel for restoring the power to said lay-beam frame; substantially as set forth.

20. In a power-loom, the warp and cloth beams, the lay-beam frame, and the shuttle, combined with mechanism for at each rotation of the driving-shaft causing said lay-beam frame to perform its movement from and back to its initial position and the shuttle then to perform its travel between the warp-strands, means adapted to automatically stop said driving-shaft at the end of each of its rotations, and means to be actuated by said shuttle on reaching the end of its line of travel for continuing the loom in operation; substantially as set forth.

21. In a loom, the warp and cloth beams, the lay-beam, the shuttle adapted to carry the bobbin between the warp-strands, and means operable from the lay-beam frame for engaging the bobbin when the shuttle reaches the ends of its movements for preventing said bobbin from paying out during the forward movement of said lay-beam, whereby the lay-beam during its forward movement may place a tension on the strand leading from the bobbin and remove all slack and kinks therefrom preparatory to delivering the said strand to its final position between the warp-strands, combined with means for compelling the travel of said shuttle; substantially as set forth.

22. In a loom, the warp and cloth beams, the lay-beam, the race, and the shuttle adapted to travel between the warp-strands and over said race and comprising the bobbin-supporting frame 102, the pair of armature-rollers 103 at each end of said frame, the side bars 104 connecting said rollers, the bars 105 intermediate the rollers of each pair and at their ends pivoted to the bars 104, and the arms 106 extending from the ends of the frame 102 and at their outer ends pivoted to the bars 105, combined with the carriage 56 having the electromagnets 57 below said race, the track for said carriage, and means for moving said carriage back and forth on said track for compelling the travel of said shuttle; substantially as set forth.

Signed at New York, in the county of New York and State of New York, this 21st day of February, A. D. 1903.

WILLIAM R. BURROWS.

Witnesses:
ARTHUR MARION,
CHAS. C. GILL.